United States Patent [19]

Williams

[11] E Patent Number: Re. 33,510

[45] Reissued Date of Patent: Jan. 1, 1991

[54] HIGH HUMIDITY STEAM COOKER WITH CONTINUOUSLY RUNNING CONVEYOR

[75] Inventor: Charles E. Williams, Moorefield, W. Va.

[73] Assignee: Hester Industries, Inc., Moorefield, Wash.

[21] Appl. No.: 182,203

[22] Filed: Apr. 15, 1988

Related U.S. Patent Documents

Reissue of:

[64] Patent No.: 4,582,047
Issued: Apr. 15, 1986
Appl. No.: 60,986
Filed: Jul. 26, 1979

[51] Int. Cl.[5] ..... A23L 3/06

[52] U.S. Cl. ..... 126/369; 99/443 C

[58] Field of Search ..... 99/369, 443 C, 352, 99/339, 362, 366, 370, 404, 467, 473, 475, 477; 126/369

[56] References Cited

U.S. PATENT DOCUMENTS 812,154 2/1906 Scott .
887,628 5/1908 Hall .
992,488 5/1911 Von Epler .
998,236 7/1911 Detoy et al. .
1,157,017 10/1915 Lowe .
1,177,502 3/1916 Ewald .
1,437,882 12/1922 Barrow .
1,445,196 2/1923 Berry .
1,491,958 4/1924 Logan et al. .
1,579,517 4/1926 Chapman .
1,836,641 12/1931 Brett .
1,894,813 1/1933 Zarotschenzeff .
1,986,529 1/1935 Ray .
2,011,247 8/1935 Jourdan .
2,065,358 12/1936 Zarotschenzeff .
2,119,191 5/1938 Wilkinson et al. .
2,199,584 5/1940 Bemis .
2,234,037 3/1941 Anderson .
2,260,286 10/1941 Allan .
2,312,339 3/1943 Jones .
2,385,140 9/1945 Knowles .
2,531,506 11/1950 Geneek .
2,622,591 12/1952 Bramberry .
2,767,667 10/1956 Spooner .
2,767,668 10/1956 Spooner .
2,796,060 6/1957 Binns .
2,834,188 5/1958 Bradford .
2,846,318 8/1958 Kelly et al. .
2,880,522 4/1959 Rollins .
2,899,929 8/1959 Monroe .
2,923,138 2/1960 Rollins .
2,948,619 8/1960 Ashley .
2,951,490 9/1960 Cuillier .
2,967,405 1/1961 Taylor .
2,977,106 12/1961 Duff .
3,125,017 3/1964 Tauber et al. .
3,125,946 3/1964 Falla .
3,139,739 7/1964 Robinson .
3,144,122 8/1964 French .
3,201,951 8/1965 Robinson .
3,224,881 12/1965 Holtz .
3,228,206 1/1966 Lockerby .
3,237,551 3/1966 Keifer .
3,269,142 8/1966 DeMola et al. .
3,276,352 10/1966 Allen et al. .
3,293,879 12/1966 Van Eikeren .
3,315,492 4/1967 Dreksler .
3,338,156 8/1967 Angelos .
3,348,659 10/1967 Roinestad .
3,393,629 7/1968 Brady .
3,407,721 10/1968 Carvallo .
3,412,476 11/1968 Astrom .
3,440,950 4/1969 Moskal .
3,447,683 6/1969 Luce, Jr. .
3,469,586 9/1969 Berson et al. .
3,489,074 1/1970 Farkas et al. .
3,521,459 7/1970 Rath .
3,528,826 9/1970 Wilson .
3,529,728 9/1970 Middelbeek et al. .
3,544,341 12/1970 Reimers .
3,597,228 8/1971 Jeppson .
3,613,891 10/1971 Cloutier .
3,617,555 11/1971 Ginsburgh et al. .
3,644,124 2/1972 Bedsole .
3,649,306 3/1972 Dalgleish .
3,695,170 10/1972 Ehrenberg .
3,715,891 2/1973 Martin .
3,718,082 2/1973 Lipoma .
3,733,848 5/1973 Duron .
3,736,860 2/1973 Vischer, Jr. .
3,744,474 7/1973 Shaw .
3,747,510 7/1973 Gladd et al. .

| | | |
|---|---|---|
| 3,761,290 | 9/1973 | Brunner . |
| 3,764,343 | 10/1973 | Paugh . |
| 3,815,488 | 6/1974 | Van Dyk, Jr. . |
| 3,818,818 | 6/1974 | Hice, Sr. . |
| 3,824,917 | 7/1974 | Kawahara et al. . |
| 3,847,069 | 11/1974 | Guibert . |
| 3,866,432 | 2/1975 | Harrison . |
| 3,928,045 | 12/1975 | Tsunoda et al. . |
| 3,932,263 | 4/1960 | Leuthäuser . |
| 3,938,651 | 2/1976 | Alfred et al. . |
| 3,947,241 | 3/1976 | Carides et al. . |
| 3,961,568 | 6/1976 | Jeppson . |
| 3,982,481 | 9/1976 | Console et al. . |
| 4,056,950 | 11/1977 | Kaufman, Jr. . |
| 4,061,483 | 12/1977 | Burg . |
| 4,066,064 | 1/1978 | Vandas . |
| 4,077,528 | 3/1978 | Santen . |
| 4,079,666 | 3/1978 | Plemons . |
| 4,081,564 | 3/1978 | Borsuk . |
| 4,121,509 | 10/1978 | Baker et al. . |
| 4,124,997 | 11/1978 | Sadjina et al. . |
| 4,138,854 | 2/1979 | Schlemmer . |
| 4,164,129 | 8/1979 | Stueber . |
| 4,167,585 | 9/1979 | Caridis et al. . |
| 4,169,408 | 10/1979 | Mencacci . |

FOREIGN PATENT DOCUMENTS

| | | |
|---|---|---|
| 1131497 | 12/1962 | Fed. Rep. of Germany . |
| 1804322 | 5/1969 | Fed. Rep. of Germany . |
| 1912318 | 11/1969 | Fed. Rep. of Germany . |
| 1429986 | 3/1971 | Fed. Rep. of Germany . |
| 2142124 | 3/1973 | Fed. Rep. of Germany . |
| 2403488 | 8/1974 | Fed. Rep. of Germany . |
| 2540529A1 | 5/1976 | Fed. Rep. of Germany . |
| 2363643C3 | 10/1976 | Fed. Rep. of Germany . |
| 2756193A1 | 6/1978 | Fed. Rep. of Germany . |
| 2229991C3 | 7/1978 | Fed. Rep. of Germany . |
| 2544916B2 | 2/1981 | Fed. Rep. of Germany . |
| 978633 | 4/1951 | France . |
| 1048030 | 12/1953 | France . |
| 1588664 | 4/1970 | France . |
| 2216534 | 8/1974 | France . |
| 124447 | 4/1972 | Norway . |
| 34475 | 8/1905 | Switzerland . |
| 325971 | 11/1957 | Switzerland . |
| 339172 | 12/1930 | United Kingdom . |
| 358596 | 10/1931 | United Kingdom . |
| 478541 | 1/1938 | United Kingdom . |
| 587056 | 4/1947 | United Kingdom . |
| 602402 | 5/1948 | United Kingdom . |
| 0740870 | 11/1955 | United Kingdom . |
| 746035 | 3/1956 | United Kingdom . |
| 0861993 | 3/1961 | United Kingdom . |
| 0882959 | 11/1961 | United Kingdom . |
| 930351 | 7/1963 | United Kingdom . |
| 1040339 | 8/1966 | United Kingdom . |
| 1297917 | 10/1970 | United Kingdom . |
| 1218598 | 1/1971 | United Kingdom . |
| 1323987 | 7/1973 | United Kingdom . |
| 1423791 | 2/1976 | United Kingdom . |

OTHER PUBLICATIONS

"Space Freezer, Mini Spiral", 1-page brochure, Fujitetsumo Co., Ltd., 816 Black Diamond Way, Lodi, CA 95241-9317 (date unknown).

"Space Freezer, Mini Spiral, Spiral Type Quick-Freezing Equipment", 4-page brochure, Futitetsumo Co., Ltd., 816 Black Diamond Way, Lodi, CA 95241-9317, date unknown.

"Fujitetsumo Spiral Steamer, Space Steamer", 8-page brochure, Fujitetsumo Co., Ltd., 816 Black Diamond Way, Lodi, CA 95241-9317 (date unknown).

"Maximum Efficiency . . . Minimum Space", Ray-Cycle Rapid Refrigeration System, Space Freezer, Spiral Design, 4-page brochure, Fujitetsumo Co., Ltd., 816 Black Diamond Way, Lodi, CA 95241-9317 date unknown.

"How the Vapor-Sealed Bake Cuts One-Third Off the Fuel Bill", G. R. Fennema, *Food Industries,* Oct. 1934, pp. 452-453.

"Typical Recirculating and Non-Circulating Oven", Eugene J. Skerkoske, Eclipse Fuel Engnr. Co., Rockford, IL, IHEA Industr. Combustion School Ses. 14, pp. 343-347 (date unknown).

*Breadmaking,* Edmund B. Bennion, Oxford University Press, London, 1967, pp. 194-203.

*Primary Examiner*—Frankie L. Stinson
*Attorney, Agent, or Firm*—Nixon & Vanderhye

[57] ABSTRACT

A steam cooker processes large quantities of food products such as meat, fish, poultry and produce passed therethrough in a spiral conveyor path. The continuously running conveyor is provided with loading and unloading stations outside the cooker and with a continuously operable spray detergent cleaning bath.

Efficient cooking is achieved without loss of humidity, flavor or appearance by maintaining water drop free steam at near 100° C. and 100% humidity at a pressure greater than atmospheric and by features of the apparatus including control of steam flow out of the cooking chamber and introduction of cold air thereinto.

Two separate steam sources, internal and external, are provided with the internal source comprising a heated pool of water on the floor of the cooker chamber, which is agitated for heat transfer efficiency and to remove fat or drippings from the cooking products.

Sanitation means include mounting of machinery parts outside the cooker, access to all sides of the cooking chamber for cleaning, an internal cleaning spray system and other apparatus features.

67 Claims, 4 Drawing Sheets

HIGH HUMIDITY STEAM COOKER WITH CONTINUOUSLY RUNNING CONVEYOR

Matter enclosed in heavy brackets [ ] appears in the original patent but forms no part of this reissue specification; matter printed in italics indicates the additions made by reissue.

TECHNICAL FIELD

This invention relates to cookers and more particularly it relates to cookers through which are transported food products on a continuously moving conveyor belt.

BACKGROUND ART

In the field of industrial cooking requiring the rapid cooking and throughput of large quantities of food it has been customary to pass the food through a cooker on a conveyor belt. Typical examples of such prior art are as follows:

U.S. Pat. No. 3,982,481—E. T. Console et al. This shows a chamber through which a conveyor belt passes to carry produce for blanching in a steam spray.

Certified Manufacturing, Inc., Lynwood, Calif. 90262 has marketed gas fired broilers with a conveyor belt transport therethrough.

U.S. Pat. No. 1,491,958—J. F. Logan et al., uses a spiral conveyor to transport food in cans through a dry heat chamber.

However, in this type of prior art there are many unsolved problems relating to the cooking, the efficiency and the sanitation of conveyor type cooking systems.

Thus, particularly with rapid cooking techniques, the juices, essences moisture is withdrawn from food products changing the appearance, flavor and texture thereof.

Also the cooking may not be uniform to the center of such products as meat which needs to cooked at the inner bone structure.

In general the food products present an interface to the heating medium that does not efficiently transfer heat, such as the fat skin layer of a piece of fowl. Also, such residue as fat drippings can significantly decrease heating efficiency.

Whenever a continuously running conveyor is used it tends to carry heat out of the cooker and cool air into it. This wastes energy and establishes an uncomfortable working environment for loading the conveyor.

Also the amount of energy carried out of a hood or exhaust system is significant, and in the case of steam heat for example, there can be significant heat loss by condensation of the steam into droplets.

The conveyor belts are difficult to sanitize, particularly in those systems that pass the belt back through the cooker to bake on residue. Other movable and irregularly shaped parts in or near cookers are apt to accumulate contaminating residue and breed bacteria. Also accessibility of the systems is in many cases difficult for takedown and entry into interior compartments for cleaning and sanitation.

Accordingly, it is an object of this invention to provide an improved, efficient, sanitary conveyor type cooker for food products that resolves the foregoing problems, and provides other features and advantages which will be found throughout the following text.

BRIEF DISCLOSURE OF THE INVENTION

Food products such as fish, meat, fowl or produce are carried on a conveyor belt in a spiral path through a steam cooking chamber. The chamber is kept near 100° C. and 100% humidity by two steam sources both supplied with pure water and at a pressure above atmospheric in order to produce efficient rapid cooking without loss of humidity and with protection to appearance and flavor.

One steam source comprises a heat exchange surface in a pool of water on the floor of the chamber stirred to create heating efficiency and to skim off fat drippings from chicken or meat products. The other externally located steam generator has steam piped into the chamber.

The continuously running conveyor belt is passed on a return path outside the cooker through a continuously run spray detergent cleaning and sanitizing bath, and the internal parts of the cooker are all accessible by doors on all sides thereof. Driving machinery and elements requiring lubrication are all located outside the cooker to present simple sanitary surfaces for cleaning and sanitation. An internal cleaning spray system is also provided.

Other features are found hereinafter in the more detailed description of the preferred embodiment.

DETAILED DESCRIPTION OF THE PREFERRED EMBODIMENT

Figure 1:
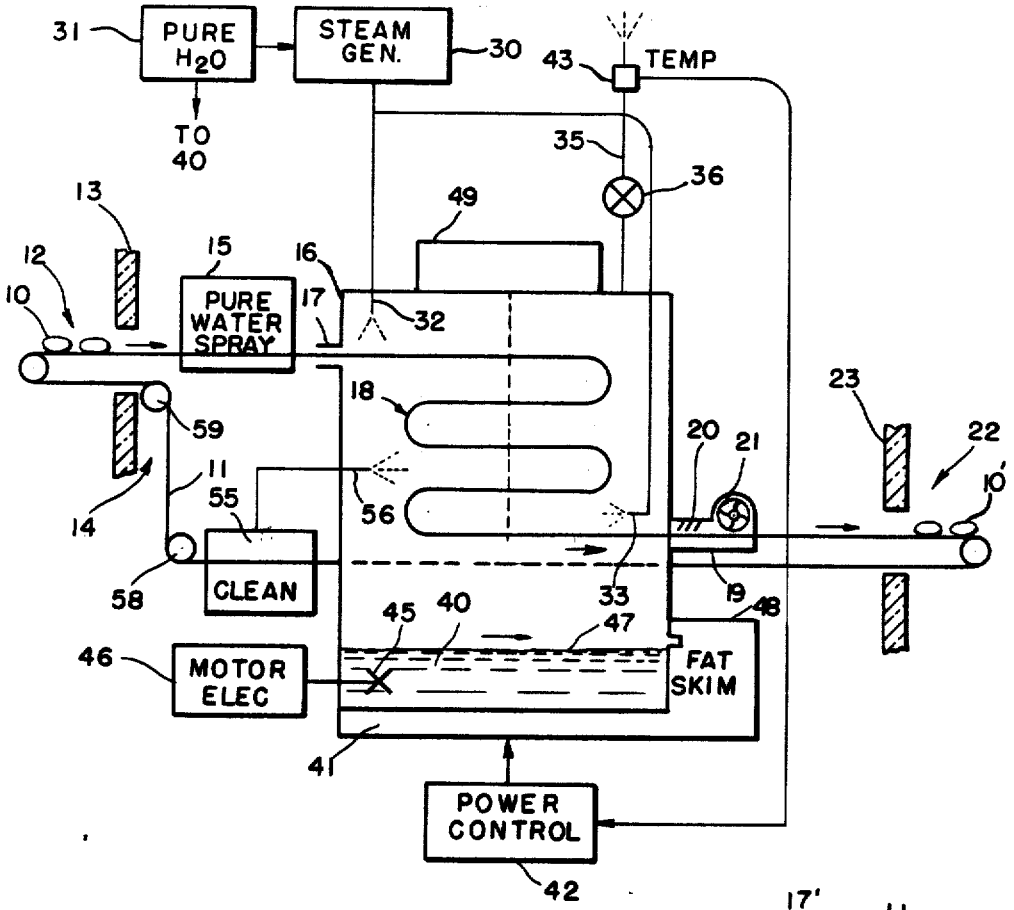
FIG. 1 is a system schematic diagram showing the various features of the invention.

The overall system and combinational aspects of the cooking system provided by this invention are set forth in FIG. 1. Thus, it is seen that food products 10 to be cooked are loaded on a conveyor belt 11 at the loading station 12 outside the cooker room wall 13. Preferably the food products are substantially uniform in size and weight such as chicken legs, sized fish filets, steaks, etc. The products thus are loaded on the conveyor belt 11 at atmospheric pressure at loading station 12 outside the cooker room 14 which is kept at a pressure above atmospheric. This not only keeps the working conditions more comfortable but improves the cooking efficiency as hereinafter shown.

The products first undergo an optional pure water spray mist process at station 15 to wet the surface of the products for better heat interface exchange with the steam inside cooker housing 16. It should be recognized that particularly in the case of meat products which are covered by a fat, this wetting step is important to reduce the insulation characteristics and to achieve more efficient and rapid cooking.

The products are then passed through a duct 17 or opening in upper part of the cooker housing and through a spiral conveyor path 18 to assure the proper dwell time within the cooker at the chosen conveyor speed. The conveyor belt is of stainless steel for sanitary purposes and is not lubricated, since that would introduce contamination for food products.

The conveyor exits the cooker housing 16 at a lower duct 19 which is in the form of a trap reducing the steam and heat energy leaving the cooker on the conveyor belt 11. Thus baffles 20 resist flow of hot air or steam out of the cooker housing 16 and fan 21 creates a counter flow of air at least sufficient to prevent any significant unnecessary outward flow of heat energy by way of gases carried outwardly by conveyor 11. This fan can control the rate of fresh air flow into cooker housing 16 as later discussed.

The cooked food products 10' are then conveyed to unloading station 22 outside cooker room 14 on the outside of wall 23. The conveyor belt is typically wide enough for several side-by-side pieces of meat, produce, fish or poultry, for example, and a typical throughput is over a ton of raw products per hour with typical cooking times of 20 minutes between input loading station 12 and output unloading station 22. The cooked product temperature is uniformly in the order of 97° C.

The cooking is solely with water droplet free steam near 100° C. and 100% humidity at a pressure above atmospheric. The high humidity atmosphere prevents losses of humidity of the product as it passes through the cooker and helps retain juices, essences and flavor of the product. Also it improves the heating steam interface heat exchange at the product surface for more efficient cooking.

The higher pressure not only produces a pressure-cooker like cooking efficiency to the cooking process, but is critical in connection with the flavor and conveyor type product flow as well. Thus, consider products loaded at the conveyor loading station 12 at atmospheric pressure when introduced into the cooking chamber will then tend to draw the steam internally within the cellular structure of the product for faster more intimate contact and quicker more uniform cooking throughout. This action also resists the leaking and removal of juices and essences of the product for better flavor control.

Part of the steam, typically 25%, is provided by a external steam generator 30 with filter to remove water droplets as supplied with pure water 31 to prevent contamination. This is piped to various locations 32, 33 within the cooker to assure a constant circulating flow of steam near 100% humidity 100° C. atmosphere about the products being carried on belt spiral 18. Also, for example, a jet 33 may flow steam in a direction counter the belt flow path to create a circulation path preventing undesired loss of steam out of duct 19 as the belt leaves the cooker, and together with fan 21 can create a desired ratio on input of outside air for circulation.

For this purpose an outlet stack 35 will let out of the cooking housing 16 an amount of steam flow controlled by valve means 36.

The remaining steam is provided by an internal boiler having the pool of water 40 on the floor of the cooking chamber as heated by the heat exchange element 41. To assure the right amount of steam and pressure within the cooking chamber, the power is controlled as a function of the temperature at the gas discharge stack 35 as sensed by temperature sensor 43.

For better steam producing efficiency the water in pool 40 is circulated by means such as paddle wheel 45 and electric motor 46. This is additionally used to improve steam production efficiency by creating a wave flow 47 travelling toward fat skimmer 48 which receives the crest of the waves on which the fat rides and removes the fat in the manner of a swimming pool skimmer mechanism. This prevents any accumulation of an insulating fat film on the pool 40 that prevents or reduces steam output, and further it removes a substance which could cause both sanitation and flavor problems if resident long in the cooker chamber. The fat is not thus broken down into a residue gas which would flavor the product adversely nor a scum which would not be easily sanitized. Also the fat may constitute a useable by-product.

Figure 2:
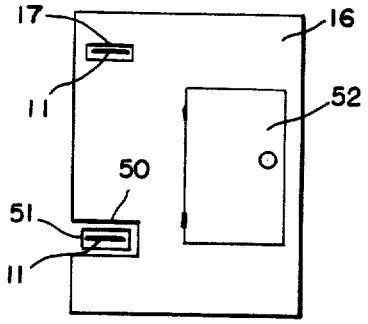
FIG. 2 is a side elevation sketch of the cooker cabinet afforded by the invention.

To further improve sanitation, those elements which require lubrication or access fat maintenance are located outside the cooking chamber, as exemplified by motor 46 and belt conveyor drive mechanism 49. Also the belt 11 is returned from unloading to the loading station outside the cooking chamber as shown by the view of FIG. 2 where there is niche 50 in the cooker housing 16 to permit a short return path through a conveyor duct 51. The access doors 52 are supplied on all sides of the housing for accessibility for maintenance and sanitation.

Additionally a detergent spray system provides for continuous cleaning of the belt 55 and for a spraying of the cooking chamber as depicted at spray outlet 56 with a sanitary detergent solution.

Figure 3:
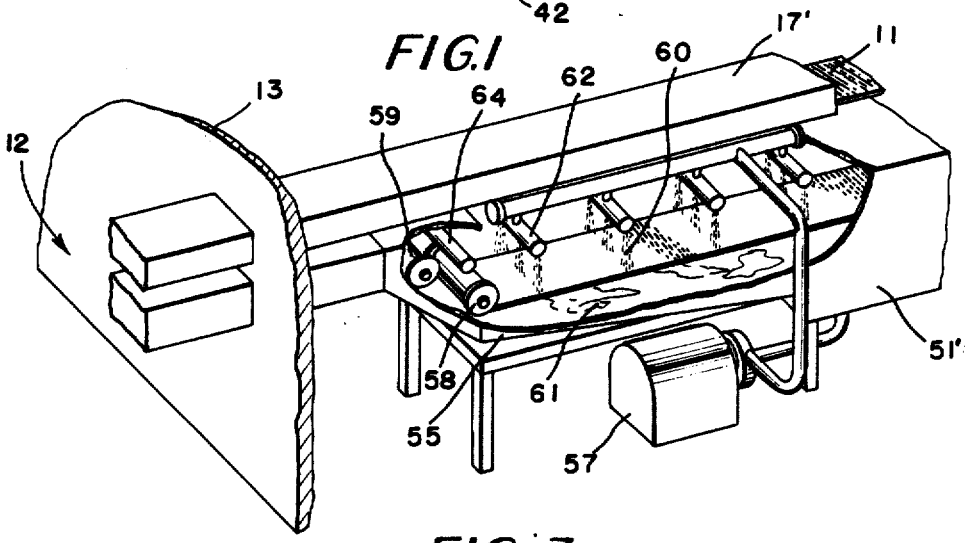
FIG. 3 is a diagrammatic view, partly broken away, of a continuous conveyor belt spray cleaner afforded by the invention.

The belt cleaning spray mechanism is shown in detail in FIG. 3, which with all succeeding figures uses similar reference characters for common features to facilitate comparison.

Installed in the return duct 51' about the stainless steel conveyor belt 11 is a spray wash unit 55 powered by continuously running motor-pump 57. The belt has interconnected stainless steel segments which permit travel around guide rollers 58, 59 and other flow paths within the system. The conveyor belt 11 has a central open grating upon which the products rest which permits steam and detergent spray solution 60 to flow through the belt into sump 61 for recirculation by motor-pump 57.

Sufficient spray nozzle arms 62 are provided with nozzle construction and spray pressure such as to dislodge any crumbs or drippings of the product remaining on the belt after cooking and unloading. A sanitary detergent solution is used to provide a sanitary belt for receiving a new loading of products at station 12 without contamination from the continuously running belt. Because the belt 11 does not return through the cooker, there is less tendency to bake on any residue and the cleaning function is simplified. Brushes may be used if desired and the brush 64 removes moisture from the roller 58 to keep the belt drier. It dries rapidly because it is warm after leaving the cooker and the reduced atmospheric pressure outside wall 13 permits quick evaporation of residue moisture. The solution in sump 61 is filtered for removing residue before recirculation by the pump, and the detergent solution can be changed as often as necessary to maintain strict sanitary conditions without possibility of introducing bacteria or retaining contaminating residue. Note all mechanisms such as pump 57 are kept outside the sanitary cooking compartment and ductwork 17', 51' keeping any foreign substances off the belt 11.

Figure 4:
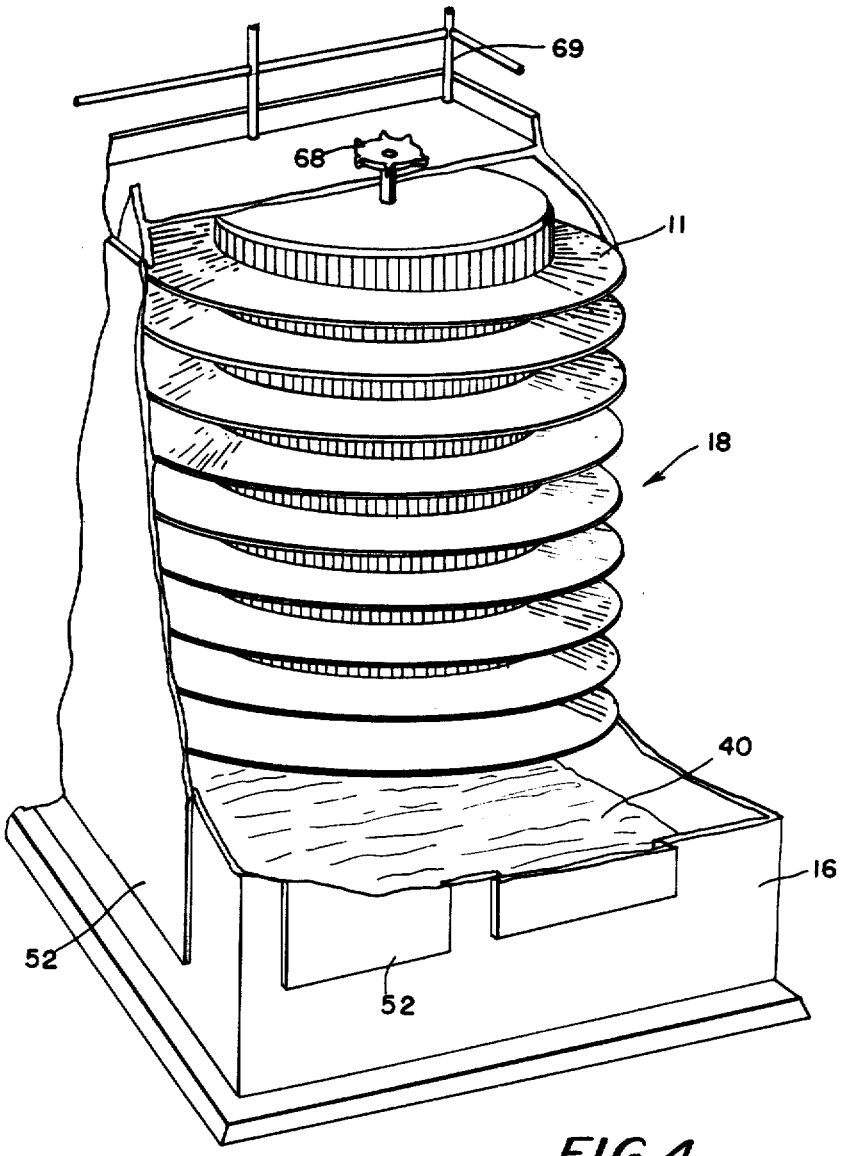
FIG. 4 is a diagrammatic view in perspective, partly broken away, showing the spiral conveyor path within the cooker as afforded by this invention.

Features shown in FIG. 4 include the spiral path 18 taken by the belt 11 through the cooker chamber, access doors 52, etc. for internal access, maintenance and sanitation and the placement of drive means such as chain sprocket 68 for driving the conveyor belt through the spiral path 18 and its associated drive mechanisms. The catwalk array 69 gives a size perspective of the cooker housing 16, and provides access to top entry panels and the mechanism 68 for maintenance. The spiral belt path may have as many convolutions as necessary to retain particular specialty products within the cooking chamber a desired dwell time for the desired belt travel speed.

Figure 5:
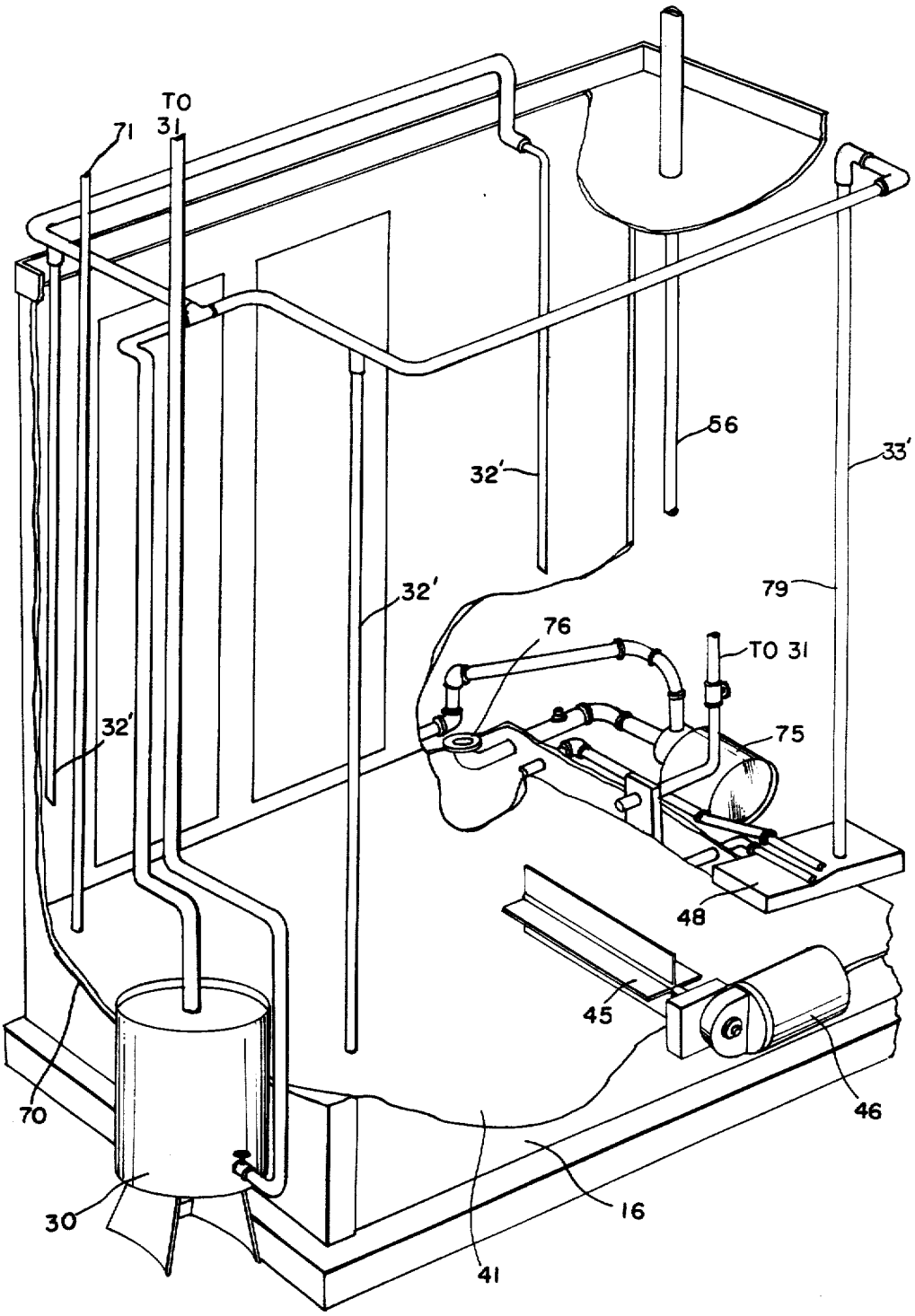
FIG. 5 is a diagrammatic view in perspective, partly broken away, showing the steam supply means for the cooker as afforded by this invention.

Details of the heating mechanisms are shown in FIG. 5. For sanitary purposes stainless steel is used wherever possible to avoid any surfaces that could cause dripping or collect contamination. The interior 70 of the housing walls is insulated to preserve heat and to produce a safe and lower temperature outside wall environment around operational personnel.

The steam generator unit 30 could be any standard commercially available steam generator unit and is preferably made of stainless steel. It is coupled to a boiler for a supply of sanitary steam from pure water by means of piping 71. Approved pure water make-up is entered from source 31 to assure sanitary steam. All piping is stainless steel sanitary steam pipe with pipe insulation having sanitary jacketing.

The floor water may be pumped out by pump 75 through drain 76 when sanitizing by detergents from piping 56.

The fat skimmer duct 48 has internal baffling to reduce the loss of hot water and it leads to a settling tank (not shown) for segregation of fats.

The external steam is preferably disposed through piping 78 to the four corners of the cooking chamber and steam is released at nozzles 32', 33' or along the length of the piping such as shown at 79 to provide proper mixture and saturation along the spiral conveyor path with the steam evaporated from the lower water pool.

Figure 6:
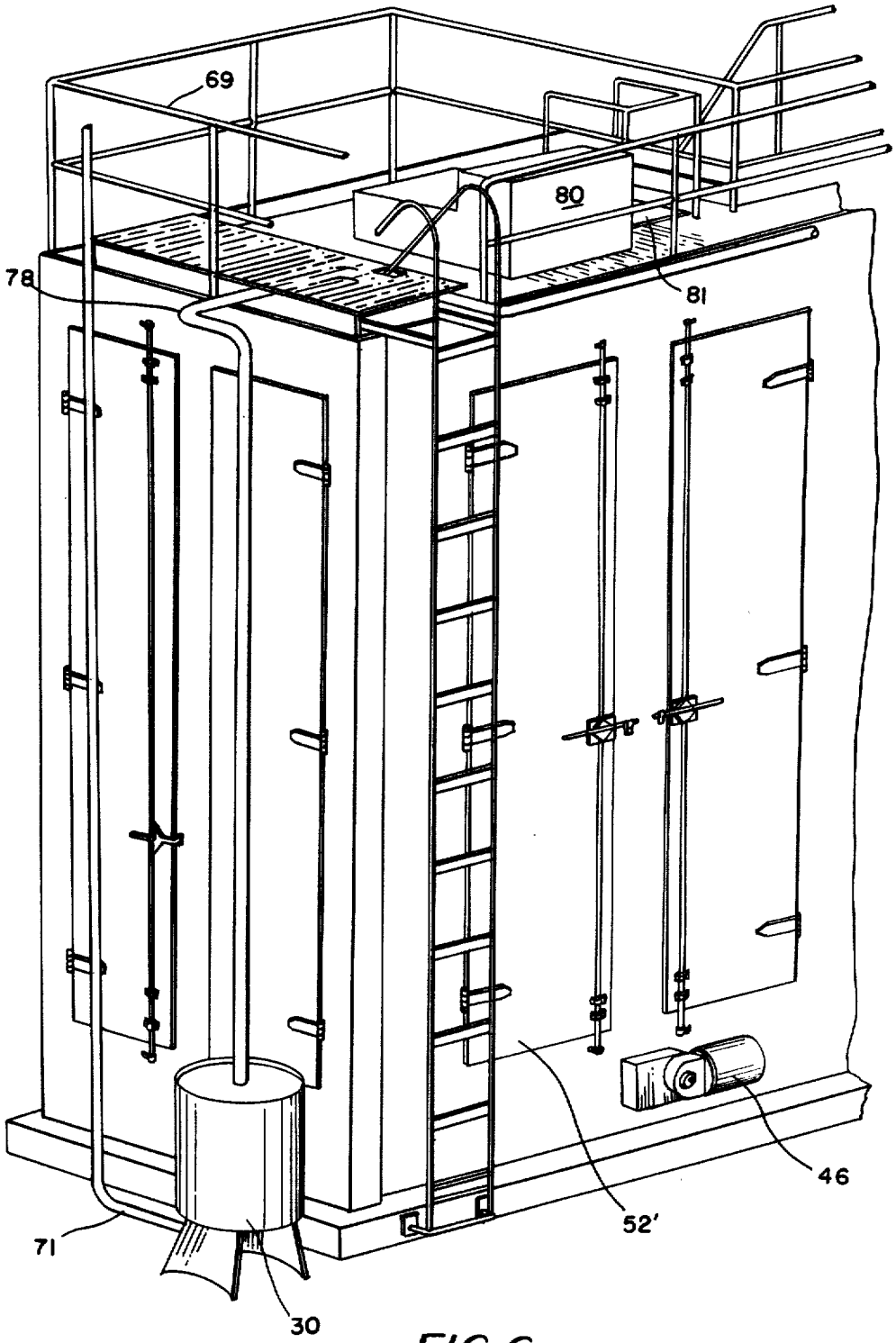
FIG. 6 is a perspective view of the cooker cabinet array as provided by this invention.

Externally the cooking cabinet 16 is shown in FIG. 6. The top housing 80 encloses the mechanisms for driving the spiral conveyor system within housing 16 and the top access door 81 permits entry for maintenance, inspection, sanitation and the like.

It is therefore evident that the steam cooking system provided by this invention has advanced the state of the art and provided many improved features. Those novel features believed descriptive of the spirit and nature of the invention are set forth with particularity in the appended claims.

INDUSTRIAL APPLICATION

Large volumes of food products are processed on a continuously running conveyor belt passing through an energy efficient steam cooker which preserves product humidity, flavor and appearance. Thus, fish, meat poultry, produce and like food products can be cooked. There are self-cleaning and apparatus features for meeting the strictest of sanitation requirements.

I claim:

1. A food cooking system cooking solely with steam foods such as fish, fowl, meats or produce carried through a cooker on a continuously running conveyor belt, comprising in combination, a cooker housing, means passing said conveyor belt through said housing to expose food products within the cooker housing only to said steam as the sole cooking medium, and two sources of steam providing said steam to cook the food products, nozzles for releasing steam located inside said housing, one comprising a steam generator supplying supplemental steam into said housing at said nozzles located thereinside to maintain the atmosphere together with the other steam source at near 100% humidity 100° C. and a pressure above atmospheric, and the other source of steam comprising a pool of water within said housing with steam means for boiling the water to create steam.

2. The system defined in claim 1 having a steam exhaust pipe, and heat control means for said pool of water regulated as a function of the temperature at said exhaust pipe.

3. The system defined in claim 1 having an opening in said housing into which said conveyor belt passes, and means establishing said steam pressure at a sufficient magnitude to discharge steam at a controlled rate from said housing about the entering conveyor belt.

4. The system defined in claim 3 with an opening in said housing out of which the conveyor belt passes and having a steam flow path created within said housing by said nozzles tending to draw air into the latter said opening to produce a flow path out of the former opening thereby circulating air and steam.

5. A system as defined in claim 1 including means driving said conveyor belt through said housing with all mechanisms requiring lubrication mounted in a compartment outside the housing thereby to avoid food contamination.

6. A system as defined in claim 1 wherein the housing is positioned within a secondary housing such as a room where the pressure is maintained above atmospheric.

7. A system as defined in claim 6 including a station for loading food products through which said conveyor belt passes outside said secondary housing so that the food products are maintained at atmospheric pressure until they enter the cooker system whereby the increased pressure and high humidity cause efficient penetration of heat into the products to cook them evenly throughout by establishing a temperature approaching 100° C.

8. A system as defined in claim 1 adapted for processing meat and fowl products which may drip fat into said pool of water, including means continuously skimming the fat from the top of the water to improve the steam capacity thereof.

9. A system as defined in claim 8 wherein the fat skimming means comprises a paddle wheel on one side of the pool generating waves travelling to the other side of the pool and a fat skimmer receiving the crest of the waves and fat residing therein and removing such from the pool of water.

10. A system as defined in claim 8 wherein the heating means for the pool of water comprise heat exchange elements at the bottom of said housing, including means circulating the water over said heat exchange elements to improve the effective steam output efficiency.

11. A system as defined in claim 1 wherein said housing has access doors for entry thereinto on all sides.

12. A system as defined in claim 1 wherein the conveyor belt is passed inside said housing in a spiral path [coiling downwardly to carry said foods through said housing from an upper to a lower position in said near 100% humidity atmosphere which prevents water dripping downwardly upon the foods being cooked on the belt].

13. A system as defined in claim 1 including means pre-moistening the food products on said conveyor belt before entry into said housing to thereby create an efficient heat interchange surface on the food products for heating by said steam.

14. The system defined in claim 13 wherein the conveyor belt path passes from a loading station at atmospheric pressure into an enclosure above atmospheric pressure and said moistening means comprises means located within said enclosure producing a fine spray mist covering the surface of the food product on the belt without droplets or steaming.

*15. A self-contained continuous food cooking system comprising:*

*a cooker housing which establishes an interior space;*

*food-conveyance means for introducing food products into said interior space at an inlet of said cooker housing and for removing the food products from said interior space at an outlet of said cooker housing spaced from said housing inlet;*

*said food-conveyance means defining a generally spiral path of conveyance for said food products in said interior space, which interior path provides a sufficient dwell time for the food products in said interior space as the food products are substantially continually translated along said defined interior path between said housing inlet and said housing outlet;*

*said cooker housing including (i) an internal pool of water having a surface at a level below said interior path, and (ii) means in heat-exchange relationship to said pool of water for converting a quantity of water in said pool to steam to thereby provide a steam atmosphere within said interior space which directly contacts said food products to at least in part cook the food products during the translation of the food products along said interior path, whereby at least partially cooked food products exit the cooker housing at said outlet thereof.*

*16. A cooking system as in claim 15, which further comprises skimmer means for removing a residual film of food-cooking by-products from said pool of water.*

*17. A cooking system as in claim 16, wherein said skimmer means includes a skimmer adapted to collect the removed food-cooking by-products, and means for creating travelling disturbances on said surface of said pool of water which cause said by-products to move towards said skimmer to be collected thereby.*

*18. A meat cooking system as in claim 15, wherein:*

*said food-conveyance means includes an endless conveyor belt for supporting and moving with said food products during their translation along said interior path and which includes a return path exterior of said cooker housing between said outlet and inlet, and wherein the system further comprises*

*means located along said return path exterior of said cooker housing for cleaning food product residue from said endless conveyor before said conveyor reenters said cooker housing inlet.*

*19. A cooking system as in claim 15 wherein said steam is high humidity steam and said food products are directly exposed to said high humidity steam.*

*20. A cooking system as in claim 15 wherein said food-conveyance means comprises a moving perforated belt and said food products are stationary with respect to said belt and move with said belt.*

*21. A cooking system as in claim 15 wherein said housing outlet is vertically spaced from said housing inlet.*

*22. A cooking system as in claim 15 wherein said interior path includes a plurality of stacked convolutions, the travel of said food products along said stacked convolutions in part providing said sufficient dwell time.*

*23. A cooking system as in claim 22 wherein a lowermost one of said plural convolutions is above the level of the surface of said pool of water.*

*24. A food cooking system for cooking food products carried on a moving conveyor belt, comprising:*

*a cooker housing:*

*means disposed within said housing for defining a conveyance path,*

*a conveyor belt disposed along said conveyance path for supporting and conveying said food products along said path,*

*means coupled to said belt for causing said belt and said food products supported thereby to substantially continually translate along said conveyance path through said housing to expose food products within the housing to steam, said path retaining said translating food products within said housing for at least a desired dwell time, and*

*a source of steam providing steam to contact and cook the food products, said steam source comprising at least one of the following:*

*an external steam generator supplying steam into said housing, and*

*a pool of water within said housing with heating means communicating with said pool of water for creating steam.*

*25. A cooking system as in claim 24 wherein said conveyance path forms a spiral including plural vertically stacked convolutions, the number of said stacked convolutions in part providing said desired dwell time.*

*26. A cooking system as in claim 24 wherein said steam source provides high humidity steam and said food products are directly exposed to said high humidity steam.*

*27. A cooking system in claim 24 wherein said conveyor belt comprises a perforated belt that moves with said food products.*

*28. A cooking system as in claim 24 wherein said source of steam is disposed in a lower portion of said cooker housing.*

*29. A cooking system as in claim 24 wherein steam within said housing condenses and is reheated and recirculated as steam by said steam source.*

*30. A cooking system as in claim 24 wherein said translation causing means continually moves said belt.*

*31. A continuous food cooking system comprising:*

*a housing;*

*means for defining an internal conveyance path within said housing,*

*means disposed along said internal conveyance path for supporting and substantially continually translating food products along said internal path, said food products cooking while within said housing and producing a by-product, said internal path retaining said translating food products within said housing for a dwell time;*

*internal steam producing means disposed within said housing for producing steam that contacts said food products, said internal steam producing means including:*

*a water reservoir generally disposed at the bottom of said housing for collecting said by-product, and*

*a heat exchanger applying heat to said water reservoir to convert some of the water in said reservoir to steam,*

*said steam contacting said food products translating along said path; and*

*means communicating with said water reservoir for facilitating said steam conversion by removing said by-product.*

*32. A cooking system as in claim 31 wherein said by-product is fat and said facilitating means comprises:*

*means for agitating said water reservoir to produce waves on said reservoir surface; and*

*skimmer means coupled to said reservoir for skimming said fat by-product from said reservoir surface in response to said waves.*

*33. A cooking system as in claim 31 wherein:*

*said housing includes outlet stack means for exhausting a controlled amount of said steam from said housing, and*

*temperature sensing means coupled to said outlet stack means for sensing the temperature of steam exhausted by said outlet stack means; and*

*said heat exchanger includes control means for controlling the amount of heat applied thereby to said water reservoir in response to said sensed temperature.*

*34. A cooking system as in claim 31 wherein said internal conveyance path forms a spiral including a plurality of vertically arranged convolutions.*

*35. A cooking system as in claim 31 wherein said steam producing means produces high humidity steam and said food products are directly exposed to said high humidity steam.*

*36. A cooking system as in claim 31 wherein said supporting and translating means comprises a perforated belt that moves with said food products, said food products resting on said belt.*

*37. A self-contained recirculating continuous steam cooker comprising:*

*a housing having a floor and walls enclosing an interior space;*

*means disposed within said interior space for supporting and substantially continually translating food products along a conveyance path within said housing, said path retaining said translating food products within said housing and permitting said food products to at least partially cook within said housing for a desired dwell time;*

*internal steam means disposed within said housing for producing steam, said internal steam means including:*

*a water reservoir disposed on the floor of said housing and having a surface in contact with said interior space, and*

*heat exchange means for producing steam, said steam contacting and heating said food products and said housing and thereby forming a condensate, said condensate returning to said water reservoir and recirculating.*

*38. A cooker as in claim 37 further comprising paddle wheel means disposed within said reservoir for agitating said reservoir.*

*39. A cooker as in claim 37 further comprising:*

*means for agitating said water reservoir; and*

*means coupled to said reservoir for removing fat by-product from the reservoir surface so as to prevent said fat by-product from inhibiting steam production.*

*40. A cooker as in claim 37 wherein:*

*said housing includes outlet stack means for exhausting a controlled amount of said steam from said housing, and*

*temperature sensing means coupled to said outlet stack means for sensing the temperature of steam exhausted by said outlet stack means; and*

*said heat exchange means includes control means for controlling the amount of heat applied to said water reservoir in response to said sensed temperature.*

*41. A cooker as in claim 37 wherein said internal steam means produces high humidity steam and said food products are directly exposed to said high humidity steam.*

*42. A cooker as in claim 37 wherein said supporting and translating means comprises a perforated belt that moves with said food products, said food products resting on said belt.*

*43. A cooking system for cooking food products such as poultry, said cooking system comprising:*

*a housing;*

*means for defining a conveyance path within said housing, including a belt supporting and substantially continually translating said food products along said path, said path retaining said translating food products within said housing for a desired dwell time such that said food products are heated while within said housing to a desired temperature;*

*means for providing steam within said housing, said steam contacting said food products and at least in part heating and cooking said food products and causing said food products to produce a fat by-product;*

*means disposed at the floor of said housing for collecting said fat by-product; and*

*means connected to said collecting means for removing said collected fat by-product from said housing.*

*44. A system as in claim 43 wherein said collecting means includes:*

*a pool of water within said housing having a surface at a level below a lowermost convolution of said path; and*

*means for removing fat by-product floating on said surface of said pool of water.*

*45. A cooking systems in claim 44 wherein said removing means comprises skimmer means for removing a residual film of fat by-products from said pool of water.*

*46. A cooking system as in claim 45, wherein said skimmer means includes a skimmer adapted to collect the removed fat by-products, and means for creating travelling disturbances which cause said film to move towards said skimmer to be collected thereby.*

*47. A cooking system as in claim 43 wherein said conveyance path forms a spiral including plural vertically stacked convolutions.*

*48. A cooking system as in claim 43 wherein said conveyance path is non-linear.*

*49. A cooking system as in claim 43 wherein said conveyance path is circular.*

*50. A cooking system as in claim 43 wherein said steam providing means provides high humidity steam and said food products are directly exposed to said high humidity steam.*

*51. A continuous cooking system for cooking food products such as meat, said cooking system comprising:*

*a housing comprising thermally insulated walls and at least one access door;*

*means for defining a conveyance path within said housing;*

*a conveyor belt disposed along said path for supporting and substantially continually translating food products along said path;* means mechanically coupled to said belt for moving said belt, said path retaining said translating food products within said housing for a desired dwell time so as to heat said meat products within said housing to a desired temperature; and

*steam providing means for providing substantially water droplet free steam within said housing, said steam directly contacting the outer surface of said food products and thereby at least in part heating said food products.*

*52. A system as in claim 51 further including at least one further heat source means for heating said food products within said housing.*

*53. A cooking system as in claim 51 wherein said conveyance path includes plural vertically stacked paths.*

*54. A cooking system as in claim 51 wherein said conveyance path is spiral.*

*55. A cooking system as in claim 51 wherein said steam providing means provides high humidity steam and said food products are directly exposed to said high humidity steam.*

*56. A cooking system as in claim 51 wherein said food products rest on said conveyor belt and move with said belt.*

*57. A continuous steam cooking apparatus for cooking food products such as meat having an outer fat layer, said apparatus comprising:*

*a housing,*

*means for defining a conveyance path, said path including an internal conveyance path within said housing and an additional external conveyance path outside said housing, said internal and external paths being connected to at least in part form an endless, continuous path, said internal path retaining said food products translating along said path within said housing for a desired dwell time;*

*an endless belt disposed along said internal and external paths, said belt adapted for supporting and translating said food products along said paths;*

*means coupled to said belt for moving said belt along said internal and external paths;*

*means for providing steam within said housing to come into direct contact with the outer surfaces of said food products supported and translated by said belt so as to at least in part cook said food products; and*

*cleaning means disposed outside said housing and along said external path for cleaning food product residue from said belt.*

*58. Apparatus as in claim 57 wherein:*

*said steam providing means includes:*

*a water reservoir disposed on the floor of said housing, said water reservoir defining a surface below said internal path; and*

*heat exchange means communicating with said water reservoir for producing steam, said steam contacting and heating said food products and said housing and thereby forming a condensate, said condensate returning to said water reservoir and recirculating as steam; and*

*said apparatus further includes means for removing said liquid fat by-product from said water reservoir surface so as to prevent said by-product from inhibiting said steam production.*

*59. An apparatus as in claim 57 wherein said steam providing means provides high humidity steam and said food products are directly exposed to said high humidity steam.*

*60. An apparatus as in claim 57 wherein said food products rest on and move with said belt.*

*61. An apparatus as in claim 57 wherein said internal path is spiral.*

*62. An apparatus as in claim 57 wherein said internal path includes plural vertically stacked convolutions.*

*63. An apparatus as in claim 57 further including premoistening means disposed along said external path between said cleaning means and said housing for premoistening the surface of said food products supported by said belt before said products enter said housing so as to reduce insulation characteristics of said fat layer disposed on said food products and thereby permit said steam to more rapidly cook said food products.*

*64. A continuous food cooking system comprising:*

*a housing;*

*means for defining an internal conveyance path within said housing,*

*means disposed along said internal conveyance path for supporting and substantially continually translating food products along said internal path, said food products cooking while within said housing and producing a by-product, said path having sufficient convolutions to retain said translating food products within said housing for a desired dwell time; and*

*a steam source providing steam to contact and cook the food products, said steam source comprising at least one of the following:*

*an external steam generator supplying steam into said housing, and*

*a pool of water within said housing with heating means communicating with said pool of water for creating steam.*

*65. A cooker as in claim 64 wherein said steam source comprises internal steam producing means disposed within said housing for producing steam that contacts said food products, said internal steam producing means including:*

*a water reservoir disposed at the bottom of said housing for collecting said by-product, and*

*heat exchange means for applying heat to said water reservoir to convert some of the water in said reservoir to steam, said steam contacting said food products translating along said internal path.*

*66. A cooker as in claim 64 wherein said conveyance path is spiral.*

*67. A cooker as in claim 64 wherein said food products are directly exposed to said steam.*

* * * * *

UNITED STATES PATENT AND TRADEMARK OFFICE

CERTIFICATE OF CORRECTION

PATENT NO. : Re.33,510

DATED : January 1, 1991

INVENTOR(S) : Williams, Charles E.

It is certified that error appears in the above-identified patent and that said Letters Patent is hereby corrected as shown below:

ON TITLE PAGE:

Please correct information in "[73] Assignee:" page 1, line 5, as follows:

Delete "Wash." and insert therefor -- West Virginia --.

Signed and Sealed this

Twenty-sixth Day of May, 1992

*Attest:*

DOUGLAS B. COMER

*Attesting Officer*

*Acting Commissioner of Patents and Trademarks*